Nov. 17, 1959 T. S. MOULTON 2,912,996
PORTABLE IRRIGATION SYSTEM
Filed Feb. 24, 1955 4 Sheets-Sheet 1

INVENTOR
Thomas S. Moulton
BY Robert M. Dunning
ATTORNEY

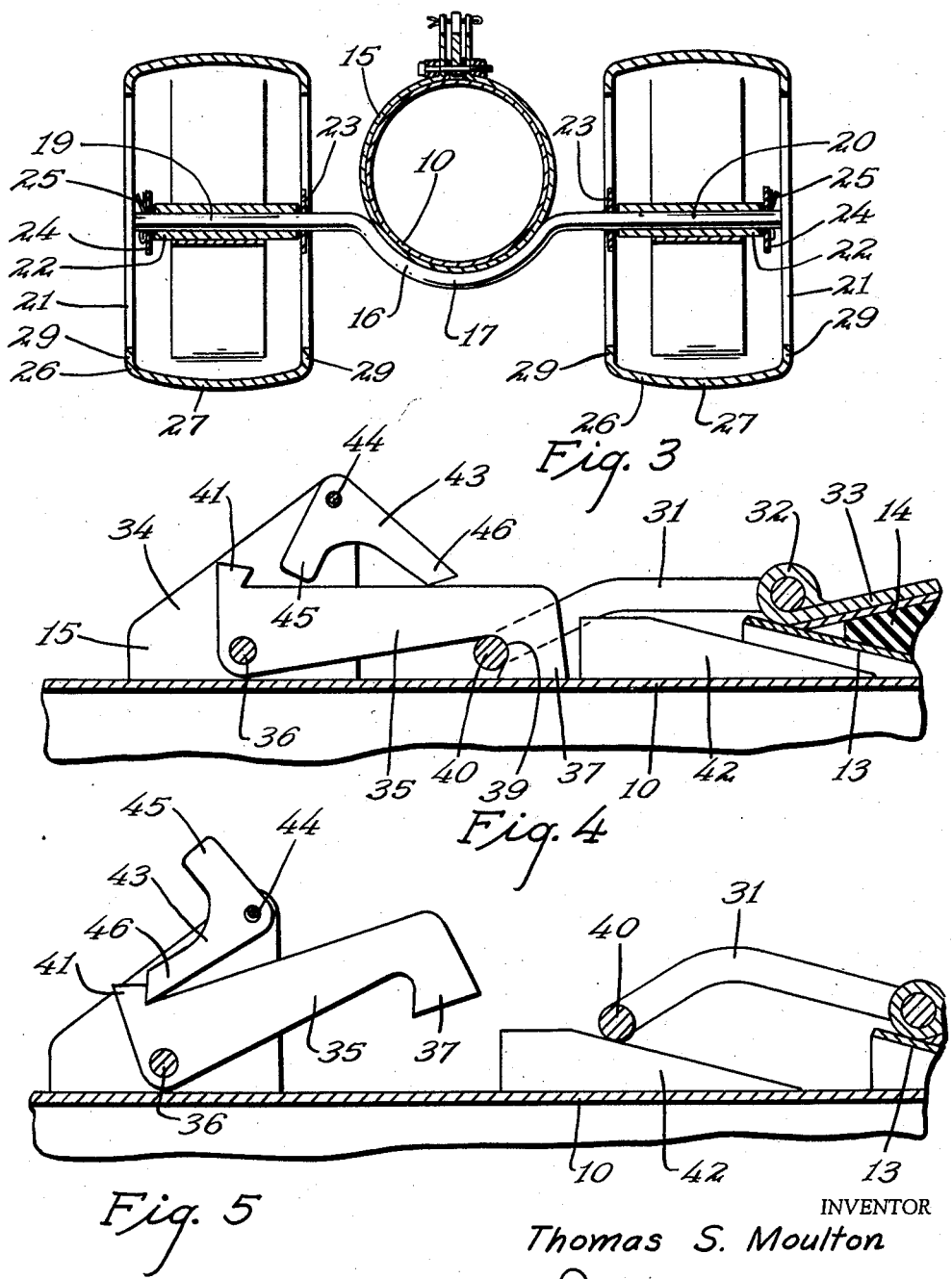

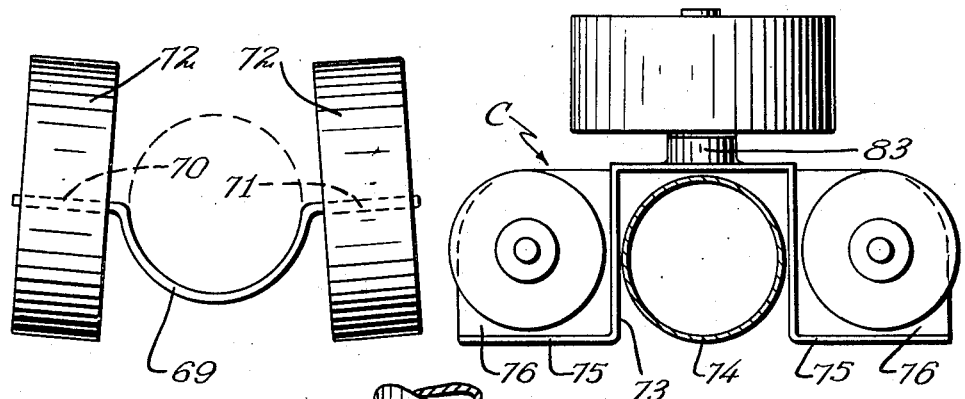
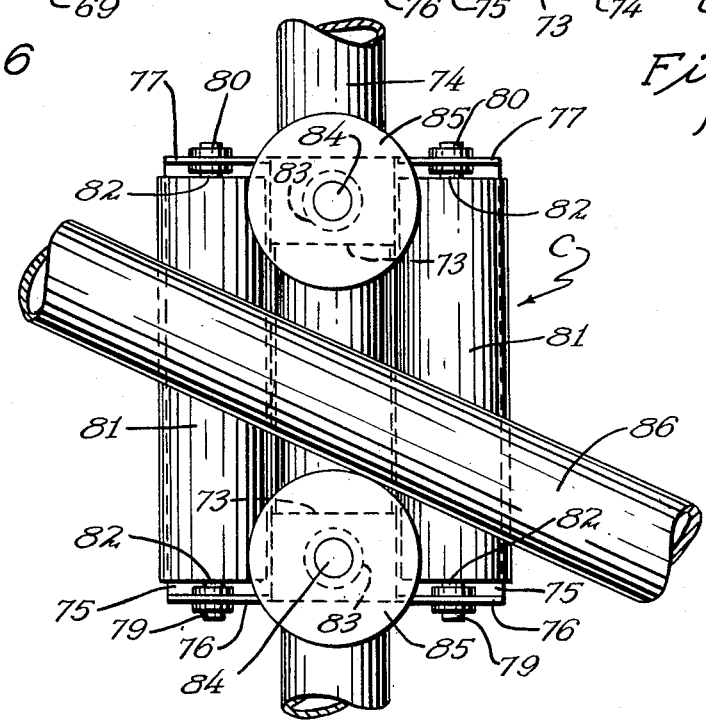
Fig. 6  Fig. 8
Fig. 7

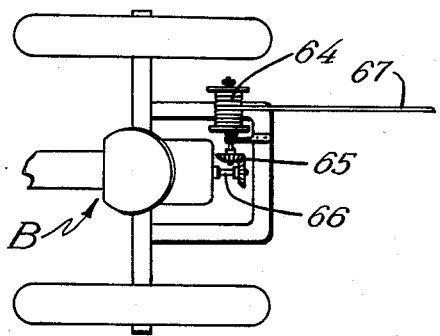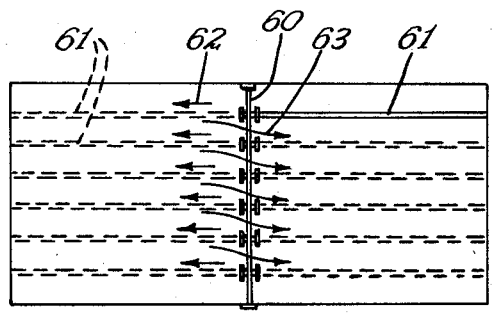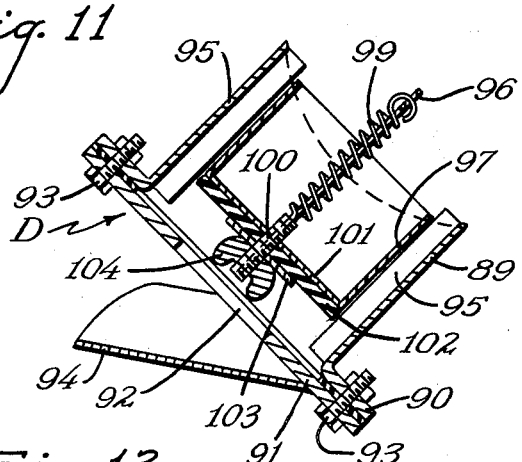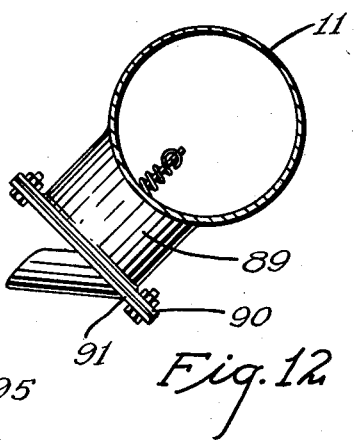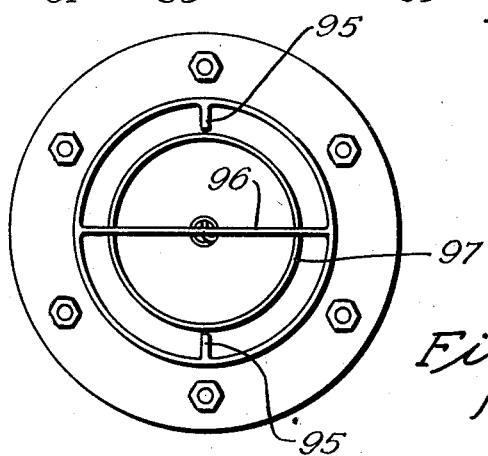

United States Patent Office 2,912,996
Patented Nov. 17, 1959

2,912,996

PORTABLE IRRIGATION SYSTEM

Thomas S. Moulton, Withrow, Minn.

Application February 24, 1955, Serial No. 490,394

1 Claim. (Cl. 137—344)

This invention relates to an improvement in irrigation systems and deals particularly with a type of portable irrigation systems which may be moved from place to place in order to properly water the entire area.

During recent years the use of portable irrigation systems has become increasingly popular. These systems usually include an elongated series of pipes connected together by flexible and detachable couplings. In many instances the position of these pipes is changed by moving each pipe length to a new location and connecting it to the next pipe by means of the coupling. In other words, the system usually comprises lengths of thin walled tubing of substantial length and diameter which can be easily coupled and uncoupled so that the entire length of pipe may be changed in position in a relatively short period of time. The pipe systems are connected at one end to a source of water under pressure which acts through sprinkler heads or other suitable water distributing means to properly water an elongated strip of land.

While such systems have been found extremely practical, some time is required in coupling and uncoupling the pipe lengths and in moving the pipe system to a new location. It has been found that if the pipes are provided with a relatively inexpensive wheeled support, the entire pipe line may be simultaneously moved by a tractor or similar device from one location to another. This system requires a minimum amount of time and effort and the system can be moved from one location to another without difficulty.

An object of the present invention resides in the provision of a carriage for a length of pipe including a pair of axially aligned wheels mounted on opposite sides of the pipe. By mounting a device of this type near one end of each length of pipe, the entire pipe line may be moved longitudinally without difficulty.

A feature of the present invention lies in the provision of a wheeled support for lengths of irrigation pipe which include a member designed to interlock with a suitable link on the cooperating end of the next adjacent pipe length. The tubing from which systems of the type described are made are normally thin walled. By mounting a portion of the coupling device upon the wheeled support and mounting the connecting link of the next length upon the coupler which is somewhat stronger than the remainder of the pipe, twisting or bending of the pipe during the movement thereof may to a large extent be eliminated.

One of the most important features of the present invention lies in combining an irrigation pipe made in quick detachable sections with a wheeled support for the pipe. This arrangement has numerous advantages over more conventional structures, and makes a highly desirable system.

In the past, hydraulic systems of the type in question have been of two general types. Some systems have been made of short pipe lengths having couplings at their ends so that one pipe length will fit into, and connect with a cooperable coupling on the next length. These lengths can usually be connected together, and taken apart, with comparative ease. However, the joints were normally not built to permit the entire pipe line to be moved simultaneously without serious danger of injury to the system.

Portable systems have been built so that the line could be moved as an unit from one position to another. Such systems usually comprise a series of pipe lengths more or less permanently connected together, so that tools are required to connect and to disconnect them. Wheels are mounted to encircle certain of the pipe lengths to rotate about the axis thereof. Such systems have not been particularly practical, as in a quarter or half mile of pipe, the pipe itself will twist sufficiently so that the sprinkler heads will not all be upright. If the pipe is turned with the wheels until the sprinklers were upright at one end, the sprinklers at a distance from the point of rotation would be inclined, or even inverted.

Thus it is a feature to provide an irrigating system in which the sprinklers are all held upright, and which can be moved as a unit. At the same time, the line can be quickly detached to encircle an obstruction such as a tree, and reattached with virtually no loss of time. The semipermanently connected pipelines of the past are time consuming in such situations.

A further feature of the present invention lies in the provision of a wheeled support for irrigation pipe and the like which includes a reinforcing band designed to encircle the pipe and be clamped in encircling position. Wheel pivots are supported to this band on opposite sides of the pipe so that the pipe may be supported between the wheels with the pivots on a place normal to the axis of the pipes.

A further feature of the present invention resides in the provision of a simple lock which may be used to hold pipes from accidental disengagement. This lock is a pivotally mounted lever which may hold the arm designed to engage a link or loop on the next pipe length from disengagement or may hold this loop engaging member in unlocked position. The lock may be moved from one position to the other by a simple pivotal movement which may be accomplished by the foot or by hand.

A further feature of the present invention resides in a system of moving the pipe from one location to the other so that an entire field may be quickly watered. This system may be followed whether the water supply line extends along the edge of the field or extends through the center thereof.

A further feature of the present invention resides in the provision of a simple bridging device capable of guiding the pipe across a water supply line extending through the center of the field so that the pipe may be drawn over the supply line without causing injury thereto.

A further feature of the present invention resides in the provision of a simple and effective valve device which may be employed to empty the pipe of water once the pressure is cut off. When the pipe line extends through a length of several hundred yards, the weight of water within the pipe tends to cause any wheeled support to sink into the ground, particularly after it has been thoroughly moistened. The valve described is positioned at intervals throughout the length of the pipe and causes the water contained to quickly drain from the pipe as soon as the pressure is released. When water pressure is again supplied, the valves close and prevent the leakage of water.

These and other objects and novel features of my invention will be more clearly and fully set forth in the following specification and claim.

In the drawings forming a part of the specification:

Figure 3 is a transverse sectional view through the pipe supporting carriage.

Figure 4 is a sectional view longitudinally through a portion of the pipe section locking structure.

Figure 5 is a view similar to Figure 4 showing the parts in a different relation.

Figure 6 is a front elevation view of a modified form of carriage.

Figure 7 is a top plan view of a bridging device by means of which the irrigation tubing may be drawn over the supply tubing without causing injury thereto.

Figure 8 is an end elevation view of the structure shown in Figure 7.

Figure 10 is a view similar to Figure 9 but showing an alternative system of moving the pipes.

Figure 11 is a diagrammatic view showing the type of apparatus which may be conveniently used to move the pipe from one position to another.

Figure 12 is a sectional view through an irrigation pipe showing a drain valve attached thereto.

Figure 13 is a sectional view through the drain pipe shown in Figure 12.

Figure 14 is an end view of the valve removed from the pipe.

Figure 1:
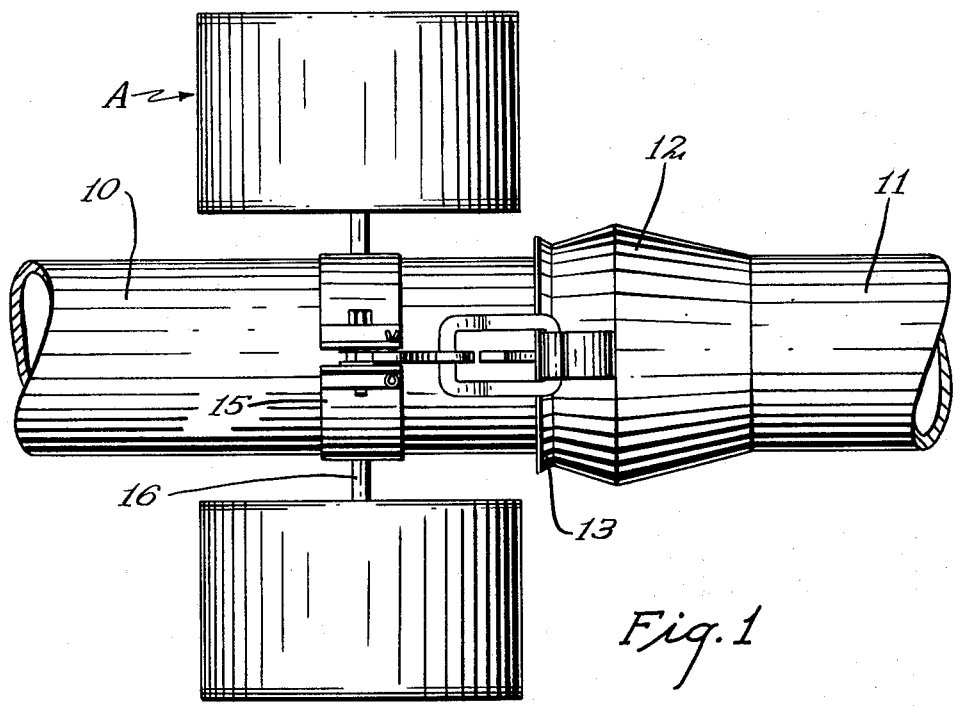
Figure 1 is a top planned view of the adjoining ends of a pair of irrigation pipes showing the arrangement thereof and the manner of supporting the pipes.
Figure 2:
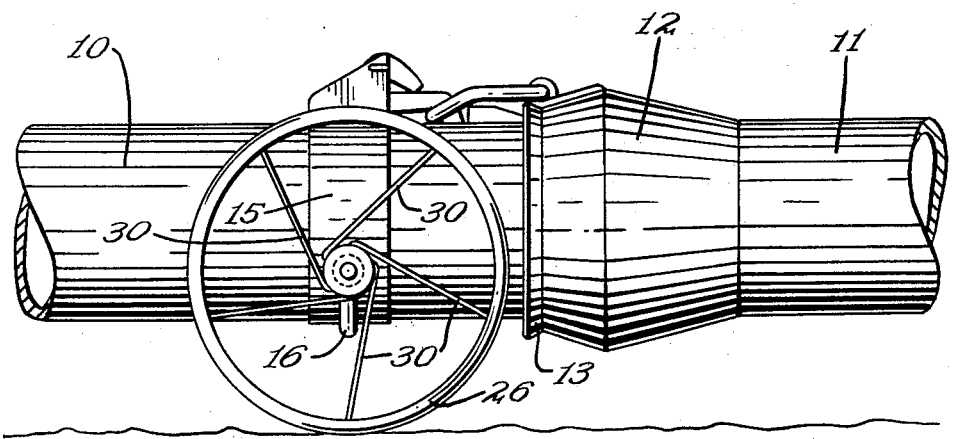
Figure 2 is an elevation view of the structure shown in Figure 1.

The irrigation system disclosed is made up of a series of pipe lengths which are connected together. One end of each length is provided with a coupling which fits about the end of the next adjoining section and permits flexibility and angularity between the lengths. Couplings of the general type illustrated have been the subjects of previous patents.

In Figures 1 to 5 of the drawings I disclose a portion of the adjoining ends of two sections, one pipe length being indicated by the numeral 10 and the next being indicated by the numeral 11, although in actual practice the pipe lengths are usually identical. A coupling 12 is shown attached to the section 11 and the end of the pipe 10 is telescoped into the coupling 12. A resilient gasket within the coupling 12 permits a tight seal to be provided between the lengths and the coupling is big enough to permit angularity between the pipes.

The coupling 12 is shown as having a flared opening 13 through which the end of the pipe 10 extends. A portion of the gasket 14 within the coupling is shown in Figure 4. In order to support the pipe lengths out of contact with the ground, I provide a carriage A which is attached to each pipe length near the end thereof opposite the coupling. In general the carriage A includes a split band 15 designed to extend around the pipe 10 and an axle 16 secured to the undersurface of the band 15 and bent to follow the contour of this band 15. The axle 16 includes the arcuate center portion 17 secured to the band 15 and includes a pair of oppositely directed wheel pivots 19 and 20.

Wheels 21 are mounted upon the pivots 19 and 20. These wheels include a central hub 22 through which the wheel pivot extends. Discs or other stops 23 are provided on the pivots 19 and 20 for limiting inward movement of the wheel hubs. Washers 24 held in place by cotter pins 25 or other suitable means hold the wheels in place.

As indicated in Figure 3 of the drawings the wheel rims 26 are generally channel shaped in section including a rounded base portion 27 and parallel side edges 29. This construction prevents the wheels from digging into the ground as the pipe line turns and permits the wheels to slide laterally if necessary.

The wheel rims 26 are connected to the hubs 22 by flat spokes 30 which may be welded to the hub to extend tangentially therefrom into contact with the wheel rim.

A locking means is provided for locking adjoining sections of pipe together. This locking means includes a loop such as 31 which is generally rectangular in form, one end of the loop extending through a transverse bearing 32 mounted upon a reenforcing strap 33 secured to the coupling 12. If desired the loops 31 may include inturned ends extending into the bearing or barrel 32 toward end abutting relation. The link 31 is preferably bent intermediate its ends so as to readily clear the end of the coupling. The ends of the band 15 extend upwardly from the pipe section 10 which it encircles to form spaced parallel ears 34. A hook shaped lever 35 is pivoted upon a pivot bolt 36 which extends through the ears 34 and may act to clamp the band 15 in place. The lever 35 is provided with a hook shaped extremity 37 formed with a notch 39 designed to engage the free end 40 of the link 31. The opposite end of the lever 35 is provided with an upward projection 41 for a purpose which will later be described.

The pipe section 10 is normally provided with a locking lug 42 over which the loop 31 extends to prevent the two pipe parts from separation. However, when the pipe is to be drawn longitudinally by a tractor or the like, the loop is engaged with the hook lever 35 to provide a more rigid or stronger connection.

A locking lever 43 is pivotally supported upon a pivot 44 extending through the ears 34. This locking lever 43 is shaped like a bell crank lever, having angularly extending arms 45 and 46 on opposite sides of the pivot 44. When the lever 43 is in the position shown in Figure 4 both arms of the lever are close to the upper surface of the hook lever 35 holding the hook end of this lever against the pipe section 10 and preventing the hook lever from pivoting. The lever remains in the position shown in Figure 4, as the longer and heavier arm 46 tends to move the lever toward this position.

Figure 9:
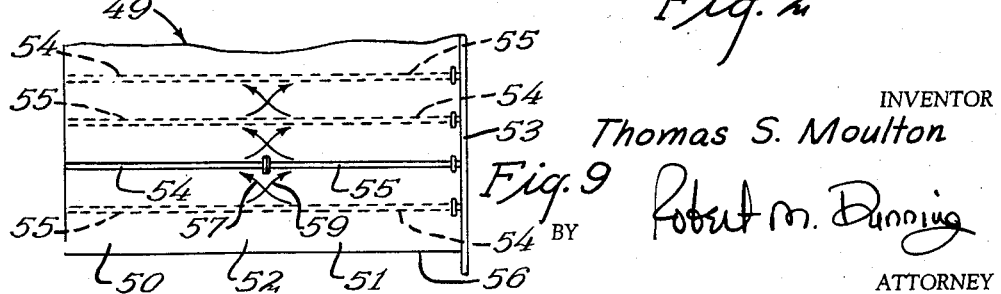
Figure 9 is a diagrammatic view showing one manner in which the irrigation tubing may be moved from one location to another in a field.

When it is desired to unhook the pipe lengths, the lever 43 is swung into the position shown in Figure 5 of the drawings. When the longer arm 46 is swung against the projection 41 of the hook lever 35 this lever 35 is swung in a counterclockwise direction into the position shown in Figure 5. The edge of the projection 41 and the upper edge of the hook lever form a notch engaging the lever arm 46 holding this lever arm in open position. The adjoining pipe section may then be easily connected or disconnected. As shown in Figure 5 the loop 31 rides over the cam shaped lug 42 dropping behind this lug. Further telescoping movement causes the end 40 of the loop 31 to extend beneath the lever 35. By swinging the lever 43 in a clockwise direction the locking lever will swing into locking position and the hook lever will engage the loop 31. The manner in which the irrigation system may be moved from place to place is indicated in Figures 9 to 11 of the drawings. In Figure 9 one arrangement is illustrated. The field 49 is divided into two halves 50 and 51 along a center line 52. A manifold 53 is shown extending along one edge of the field, this manifold acting to supply water from a suitable source of supply. In watering the field, a pipe line is employed which extends substantially the full width of the field from the manifold 53 to the opposite end thereof. The pipe line itself is divided into two sections diagrammatically indicated by the numerals 54 and 55. Each of these sections includes a series of lengths of pipe, each length being provided with wheels of the type described.

In watering the field, the pipe is first placed near one edge of the field as for example the smaller edge 56 illustrated in 59. When in this position the pipe section 55 is in the left half 49 of the field and the section 54 is in the right half 51 thereof.

After the area has been sufficiently sprinkled, the pipe sections 54 and 55 are detached at the center of the field. The section 54 is then connected to a tractor or other pulling implement and is pulled in the direction of the arrow 57 onto the half 50 of the field so that the end of the pipe section 54 which was at the center of the field, is located at the extreme left edge thereof. The left end of section 54 is capped.

The pipe section 55 is then connected to the tractor and this section is pulled in the direction of the arrow 59 into the position shown in fold lines of the drawings with the end of the pipe section which was previously at the center of the field connected to the manifold 53. The portions of the two sections now at the center of the field are connected to form a continuous line.

This procedure is continued at intervals, the section 54 being first located in the right half of the field and then at the left half thereof. By this system the two pipe sections may be quickly and easily adjusted to water the entire area of the field.

In Figure 10 of the drawing is disclosed a modified system in which the pipe line is only one-half the width of the field and in which the manifold or supply pipe 60 is positioned through the center of the field. In this arrangement the pipe line 61 is first positioned on one side of the supply pipe 61 such as the right side as illustrated in full lines. After this area is sufficiently watered, the end of the pipe line at the center of the field is disconnected from the supply and is drawn by a tractor in the direction of the arrow 62 to water an area of the field directly to the left of the center thereof. In making this change, it is obviously necessary to cap the free end of the pipe and to remove the cap from the opposite end and attach the opposite end to the supply pipe 60.

After the second area of the field has been watered the right end of the pipe is disconnected from the supply line 60 and the pipe section 61 is pulled in the direction of the arrow 63 onto the right side of the field in a position parallel to the first position shown in dotted outline. After this area has been watered, the process is continued, first pulling the pipe straight across the field to the left side thereof and then pulled in the opposite direction to the right side of the field at an unwatered area.

In order to easily pull the pipe from one position to the other, an attachment has been made to fit the rear end of a tractor such as the tractor B shown in Figure 11. A drum 64 is mounted at the rear of the tractor B and is connected by suitable gearing or other drive means 65 to the power take off shaft 66 of the tractor. The drum 64 supports a line or cable 67 which may be connected to one end of the pipe section so as to pull this section longitudinally over the field.

The advantage of the structure described lies in the fact that after an area of the field has been watered, the ground may become too soft to permit the tractor B to move close to the end of the pipe section. With the arrangement illustrated the line 67 may be unwound from the drum 64 and connected to the pipe while the tractor is positioned out of the watered area. At some time during the operation, the line 67 is wound upon the drum 64 so that the end of the pipe connected to the line 67 will be relatively close behind the tractor. This arrangement is desirable particularly where the field is bounded by fences or other obstructions as otherwise a long line connected behind the tractor would require that the tractor go substantially beyond the areas watered in order to move the pipe into proper position.

Usually the water supply pipe is provided with T connections or elbows by means of which it may be connected to the right angular pipe lines. In some instances the supply pipe is merely built up in length by the addition of more pipe sections as the distance between the source of supply and the pipe line being supplied increases in length.

In Figure 6 of the drawings is disclosed a modified arrangement in which the supporting wheels are angled inwardly to resist lateral skidding of the wheels on the ground. The means of fastening the wheels to the pipe is not shown in detail in this view and may be identical to that previously described. However, in the construction shown in Figure 6 the bracket 69 which supports the pipe is provided with laterally extending axles 70 and 71 which are inclined upwardly and outwardly at a slight angle from the horizontal. These axles support wheels 72 which may have cylindrical rims or which may be shaped similarly to the previously described wheels if it is preferred. Due to the angle of the wheels, the skidding thereof on the ground is greatly reduced as when the pipe is pulled at an angle to its longitudinal axis the wheel travelling the shortest radius arc tends to slide over the ground while the wheel travelling the greatest radius tends to dig into the ground slightly. This arrangement assists in holding the pipe upright and reduces the skidding action.

In Figures 7 and 8 of the drawings is disclosed a bridge which permits one pipe line to be pulled over another without injury to either line. A bridge of the type disclosed is particularly desirable where the right angularly extending sprinkling lines must be pulled over the supply line during movement thereof from one side of the field to the other.

In the construction shown in these figures inverted U-shaped brackets 73 are provided which are designed to straddle the supply pipe 74 and which are longitudinally spaced along the pipe 74. These U-shaped brackets 73 are connected by base plates 75 which bear upon the ground on either side of the supply pipe 74. End plates 76 and 77 are connected to the base plates 75 and the brackets 73 at opposite ends of the bridge. These plates 76 and 77 support bearings 79 and 80 respectively, one pair of bearings being aligned on each side of the supply pipe 74. Rollers 81 are provided with stub shafts 82 which extend into the bearings 79 to rotatably support the rollers about parallel horizontal axis. Bearings 83 are also provided upon the brackets 73, these bearings 83 or bosses supporting pivots 84 which rotatably support guide wheels 85. These guide wheels 85 are spaced apart a distance somewhat greater than the diameter of the pipe 86 which is to be pulled across the supply pipe 74.

In operation the bridge device C is placed in position to straddle the supply pipe 74 at any desired location along its length. The pipe line 86 is next guided between the wheels 85, the pipe resting upon the rollers 81. As a result the pipe line may be pulled across the supply pipe with little difficulty.

In Figures 12 through 14 of the drawings, is disclosed a valve which may be employed to empty the pipe lines when they are not subjected to pressure. Pipe lines of the type in question are often of considerable diameter and often must be moved over somewhat uneven ground. As a result when the water pressure is cut off from the pipe line prior to moving the same, there is a substantial weight of water in the pipe line particularly in portions thereof which are below the level of the pipe ends. This water may be substantially heavier than the pipe itself and thereby might cause considerable damage to the watered area due to the weight upon the wheels as the pipe is moved. Furthermore, the power consumed in moving a pipe filled with water is excessive.

The valve D shown in Figures 12 through 14 eliminates this difficulty. These valves are located at intervals along the pipe line, the intervals being sufficiently short to permit the release of most of the water contained in the pipe line before it is moved.

As shown in Figure 12 the structure includes a sleeve 89 which is welded or otherwise attached to certain pipe lengths, such as the length 11, to extend downwardly therefrom at an angle to the vertical. The sleeve 89 is provided with a peripheral flange 90 at its lower end. A closure plate 91 is bolted or otherwise secured to the flange 90, the closure plate 91 having a central aperture 92 therein. A gasket may be provided between the plate 91 and the flange 90 and the two parts may be connected by suitable means such as bolts 93.

A pocket shaped deflected plate 94 is secured to the closure plate 91 to lie in the path of liquid leaving the opening 92.

A series of angularly spaced guides 95 are welded or otherwise secured to the inner surface of the sleeve 89 as illustrated in Figures 13 and 14. Two of these guides extend beyond the end of the sleeve 89 which is attached to the pipe 11 and these projecting ends are connected by a cross member 96. A cup shaped element 97 is slidable within the guides 95 to move longitudinally of the sleeve 89. A spring 99 is connected at one end to the cross member 96 and is connected at its upper other end to a threaded member 100 extending through the center of the base portion 101 of the cup 97. The threaded member 100 also extends through a resilient valve disc 102 and a reinforcing washer 103 and is supplied with a wing nut 104 on its outer end by means of which the tension of the spring 99 may be adjusted from externally of the valve.

When the pipe 11 is subjected to fluid pressure, this pressure enters the cup 97. The weight of liquid within the cup, together with the pressure of the liquid upon the inner surface of the cup tends to stretch the spring 99 and to force the valve plate or disc 102 against the closure plate 91 forming a seal. In actual practice the valves are substantially water tight, but a slight leakage through the valve is not particularly objectionable as the pipe is normally used for watering the area.

When water pressure is released, the tension of the spring 99 is sufficient tod raw the cup shaped element 97 upwardly a distance sufficient to allow the water in the line to drain through the opening 92. The deflected plate 94 prevents the liquid from being forced directly into the ground so as to prevent injury to the field.

From the foregoing description it will be clear that an irrigation system has been provided which can be easily moved from place to place and which is portable in connected sections as well as in individual lengths. The system of using elongated lengths of pipe in connected sections has also been described. The manner in which the pipe sections may intersect without injury is also illustrated. The manner in which the pipe line sections are emptied of water before they are moved has also been described. All of these features work together to provide a system and apparatus which is novel and unique.

In accordance with the patent statutes, I have described the principles of construction and operation of my irrigation system, and while I have endeavored to set forth the best embodiment thereof, I desire to have it understood that obvious changes may be made within the scope of the following claim without departing from the spirit of my invention.

I claim:

An irrigation system including a series of lengths of pipe, means connecting said lengths of pipe for angular movement relative to one another, a wheel support connected to said pipe lengths, wheels on said wheel support supporting said pipe for longitudinal movement, and means at intervals in said pipe for draining said pipe when said pipe is not subjected to water pressure, and a bridge over which said pipe may move, said bridge including roller means for holding said pipe elevated and guide wheels for holding said pipe from lateral movement, said roller means being spaced apart a distance slightly greater than the pipe diameter, and having their upper surfaces at an elevation slightly greater than the pipe diameter.

References Cited in the file of this patent

UNITED STATES PATENTS

| 664,240 | Doehring | Dec. 18, 1900 |
| 854,680 | Wiberg | May 21, 1907 |
| 1,429,756 | Mitchell | Sept. 19, 1922 |
| 1,628,118 | Coles | May 10, 1927 |
| 2,512,695 | Stout | June 27, 1950 |
| 2,572,419 | Wyss | Oct. 23, 1951 |
| 2,621,061 | Beymer | Dec. 9, 1952 |
| 2,642,311 | Beymer | June 16, 1953 |
| 2,647,533 | Beymer | Aug. 4, 1953 |
| 2,652,282 | Willetts | Sept. 15, 1953 |
| 2,750,228 | Engel | June 12, 1956 |
| 2,769,664 | Cornelius | Nov. 6, 1956 |

FOREIGN PATENTS

| 517,859 | France | Dec. 22, 1920 |
| 273,177 | Italy | Mar. 31, 1930 |
| 635,424 | Great Britain | Apr. 12, 1950 |